United States Patent [19]

Stitz

[11] Patent Number: 4,888,472

[45] Date of Patent: Dec. 19, 1989

[54] RADIANT HEATING PANELS

[75] Inventor: David G. Stitz, Winnipeg, Manitoba, Canada

[73] Assignee: David G. Stitz, Winnipeg, Canada

[21] Appl. No.: 192,961

[22] Filed: May 12, 1988

[51] Int. Cl.⁴ ............ H04B 3/34

[52] U.S. Cl. ............ 219/548; 219/528; 219/544

[58] Field of Search ............ 219/213, 528, 529, 542, 219/543, 544, 545, 546, 548, 549; 428/283-290; 338/211

[56] References Cited

U.S. PATENT DOCUMENTS

| | | | |
|---|---|---|---|
| 3,595,720 | 10/1971 | Ames et al. | 156/47 |
| 3,745,649 | 7/1973 | Doi et al. | 29/611 |
| 3,774,299 | 11/1973 | Sato et al. | 29/611 |
| 3,810,304 | 5/1974 | Heibye et al. | 29/611 |
| 3,960,629 | 6/1976 | Goldsworthy | 156/180 |
| 4,092,626 | 5/1978 | Bergersen | 338/212 |
| 4,204,316 | 5/1980 | Hummel | 29/611 |
| 4,207,129 | 1/1980 | Tadewald | 219/213 |
| 4,354,886 | 10/1982 | Bergersen | 156/50 |
| 4,429,216 | 1/1984 | Brigham | 219/543 |
| 4,645,913 | 2/1987 | Oppitz | 219/549 |

FOREIGN PATENT DOCUMENTS 1116676 1/1982 Canada .

*Primary Examiner*—Bruce A. Reynolds
*Assistant Examiner*—Leon K. Fuller
*Attorney, Agent, or Firm*—Murray E. Thrift; Stanley G. Ade; Adrain D. Battison

[57] ABSTRACT

An electric heater consists of an open mesh net of heat resistant filaments, for example fiberglass filaments, carrying electrically resistive material, for example, carbon black. On either side of the net is a mat of fiberglass reinforcement. The net and the fiberglass reinforcement are impregnated with a cured, thermosetting synthetic resin. In some embodiments a ground layer is also incorporated between layers of the fiberglass mat. The heater is manufactured by assembling the heater, the fiberglass mats and any ground layers, impregnating the mat thus produced and pultruding the impregnated mat to set the resin matrix of the heater.

19 Claims, 3 Drawing Sheets

RADIANT HEATING PANELS

FIELD OF THE INVENTION

The present invention relates to electrical heaters and more particularly to the construction of radiant heating panels.

BACKGROUND

It is known to construct electrical heaters with electrical insulating material laminated on each side of a heating element. The heating element may be a resistance foil, a resistance wire, a film coated with electroconductive particles such as carbon black, or a woven glass fibre cloth impregnated with carbon black. Each of these constructions has its disadvantages.

Resistance foils and wires tend to produce hot spots and are thus prone to burn out because the usual zig-zag path produces a non-uniform distribution of the element in the layer containing the heating element. Foils, films and woven fabrics do not maintain a good bond to the insulating material. The stresses generated when the heater is used can cause delamination, voids in the material and consequent hot spots and eventually burn out of the heating element. In constructing the known heaters, air bubbles can be included in the lamination adjacent the heating element, leading to internal oxidation.

The present invention aims at the provision of an improved heating element.

SUMMARY

According to one aspect of the present invention there is provided an electric heater including: a heating element comprising an open mesh net of heat resistant filaments carrying electrically resistive material and conductive buses connected to the material at spaced locations thereon; and a matrix of cured, thermosetting synthetic resin in which the net and buses are embedded, the resin being reinforced on opposite sides of the net with an electrically insulating heat-resistant fibre material.

According to another aspect of the present invention there is provided a method of manufacturing a heating panel comprising:

locating an open mesh net of heat resistant filaments carrying an electrically resistive material and spaced apart conductive buses between two layers of electrically insulating fibre reinforcing material, thereby to provide a mat;

impregnating the mat with a liquid, thermosetting synthetic resin; and pultruding the impregnated mat to cure the resin.

The use of an open mesh net heating element allows the resin material of the surrounding matrix to penetrate the heating element and to encapsulate each of the filaments of the element individually so that the structure is integrated rather than laminated and cannot therefore delaminate. The form of the heater ensures that there are no hot spots because the current carrying components are distributed uniformly over the heating area.

The use of a thermosetting resin in the matrix and a pultruding technique for manufacturing the heater provides a number of advantages. Pultrusion is a continuous, low cost technique providing an immediately cured product. There is no need for multiple molds which are expensive and slow production. In addition, in the resultant product, the heating element is under a compressive pre-stress caused by the natural shrinkage of the resin. This ensures that the resin and the heating element remain in intimate contact and, as a beneficial side effect, increases the resistance of the net to provide an added heat capacity from the heater. There are no air inclusions in the structure and consequently no oxidation of the heated elements.

The heater may be made in various shapes and sizes. It is water-proof and resistant to other adverse environmental factors.

In some embodiments of the invention it will be desirable or necessary according to electrical standards, to provide a ground for the heating element. This is readily done by incorporating in the mat that is subsequently protruded a foraminous conductive sheet, such as a metal mesh or a perforated metal foil, spaced from the heater by a layer of the fibre reinforced matrix material. Alternatively, an outer layer of the heater itself may be made using an electrically conductive reinforcing mat embedded in the resin matrix.

BRIEF DESCRIPTION OF THE DRAWINGS

In the accompanying drawings which illustrate exemplary embodiments of the present invention.

DETAILED DESCRIPTION

Figure 1:
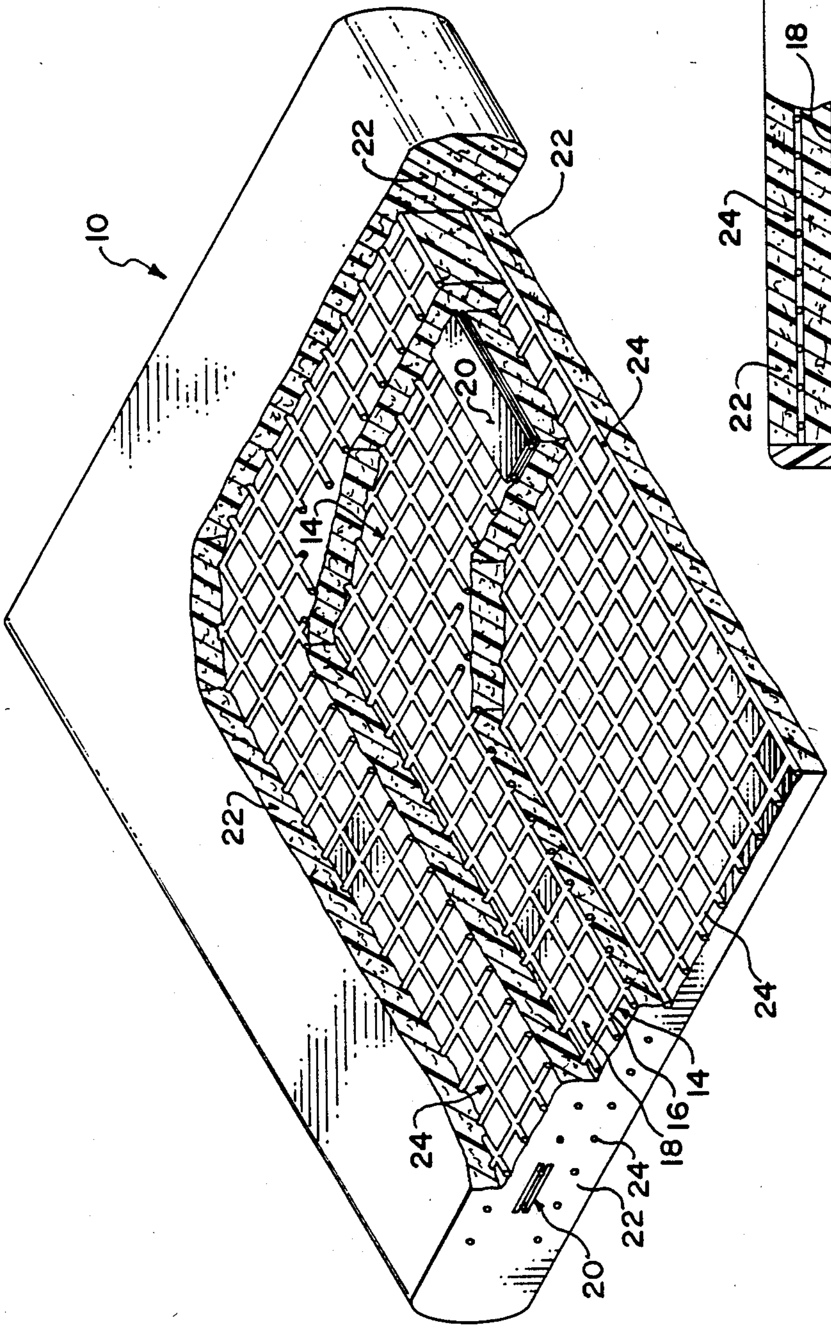
FIG. 1 is an isometric view, partially broken away, showing the internal structure of one embodiment of the heater.

Referring to the accompanying drawings, and especially to FIG. 1, there is illustrated a heater 10 in the form of a flat panel. In the centre of the heater is a heating element 12 that consists of a net 14 of filaments 16. The filaments in this embodiment are glass fibre filaments coated with carbon black. The net 14 is woven with an open mesh to provide large openings 18 between the filaments. Along .the opposite longitudinal side edges of the net are buses 20 each consisting of two layers of foil, one on each side of the net and fixed to the net by mechanical means, such as stitching. The heating element 12 is embedded in a matrix 22 of thermosetting resin reinforced with fibreglass. On each side of the heating element 12 and spaced from it by a layer of the matrix 22 is a ground layer 24. This is a metal screen itself embedded in the matrix 22.

Figure 2:
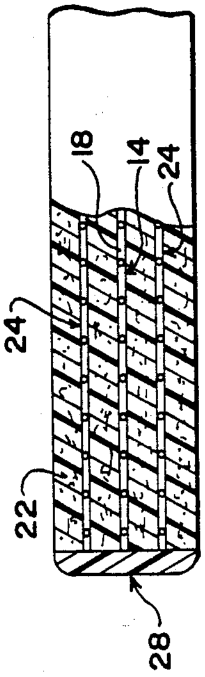
FIG. 2 is a side elevation, partially in section, of the heater of FIG. 1 showing an added sealant layer over the end.

On the sides of the panel, the ground screens and the heating element are encapsulated by the panel matrix. At the ends, the panel has been cut, exposing the screens and heating net. The exposed ends of the panel are covered with end seals 28 as illustrated in FIG. 2. This may be any suitable sealing material that is sufficiently heat resistant and will adhere to the matrix material. The heater will be completed by a junction box and electrical connections to the heating element and the ground layers. If desired, a thermostat may also be included. These components are conventional in existing heating panels and thus will not be described further herein.

Figure 3:
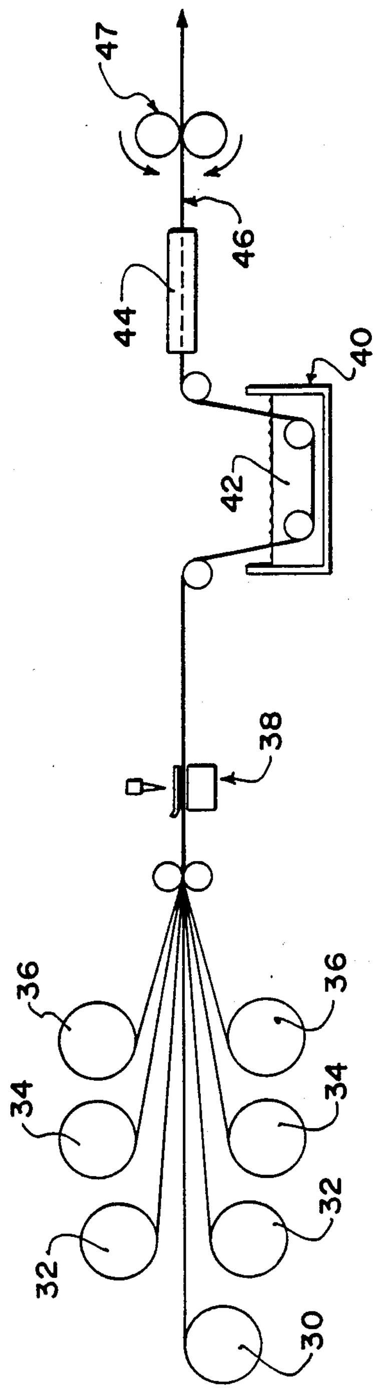
FIG. 3 is a schematic illustration representing the manufacture of a heater according to FIG. 1.

FIG. 3 of the accompanying drawings illustrates a system and method for manufacturing the heaters of FIGS. 1 and 2.

The heating element 12 is supplied in a continuous running length from a roll of material 30. The heating element is complete with the buses 20. Two fibreglass mats are fed onto either side of the heating element from rolls 32 of the material. Two rolls 34 of metal screening for forming the ground layers are then fed onto the surface of the fibreglass mats, and two further layers of fibreglass mat are fed onto the top of the ground layers from supply rolls 36. This complete core structure is then passed through a sewing station 38, where its edges are stitched together. It may be also be desirable to form additional lines of stitching, especially where the product is very wide. The resultant mat is then drawn through a bath 40 of liquid resin 42. The saturated mat is drawn through a heated pultrusion die 44 which compresses and shapes the impregnated mat and cures the resin. The mat is drawn through the process with rollers 47 acting on the completed, cured panel 46 leaving the die 44.

Figure 4:
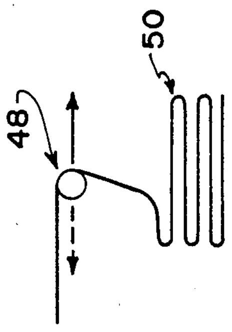
FIG. 4 is a schematic representation illustrating an alternative step in the process of FIG. 3.

FIG. 4 illustrates an alternative additional step in the manufacturing system illustrated in FIG. 3. The stitched mat leaving the sewing station 38 passes over an oscillating feed 48 that forms a folded stack 50 of the mat material. This stack may be handled, transported or the like as such. After it has been pultruded, the fold lines in the mat may be used to identify cutting lines where the cured strip from the pultrusion die is to be severed into individual heating panels.

In other embodiments of the invention, the heating element and possibly also the ground layers, may be supplied as discrete panels inserted between the layers of fibreglass mat with appropriate separations between the supplied panels. This allows the severing of the cured product into individual panels without exposing the heating element and ground layers at the ends. It also allows the ground layers to extend beyond all four sides of the heating element. As will be observed in FIG. 1, the ground layer extends beyond the longitudinal sides of the heating element to provide adequate grounding.

Figure 5:
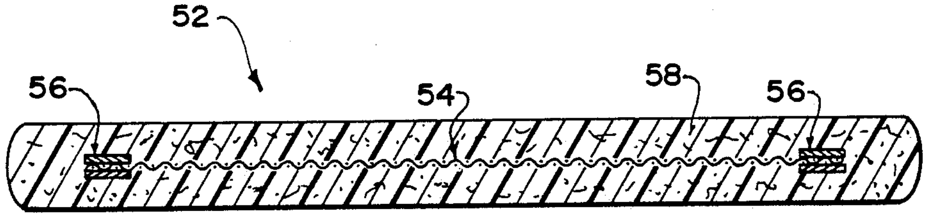
FIG. 5 is a transverse section of an alternative embodiment of the heater.
Figure 6:
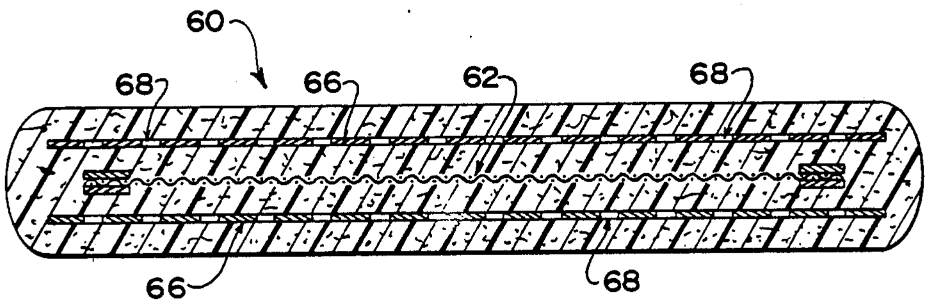
FIG. 6 is a transverse cross section of a further embodiment of the heater.
Figure 7:
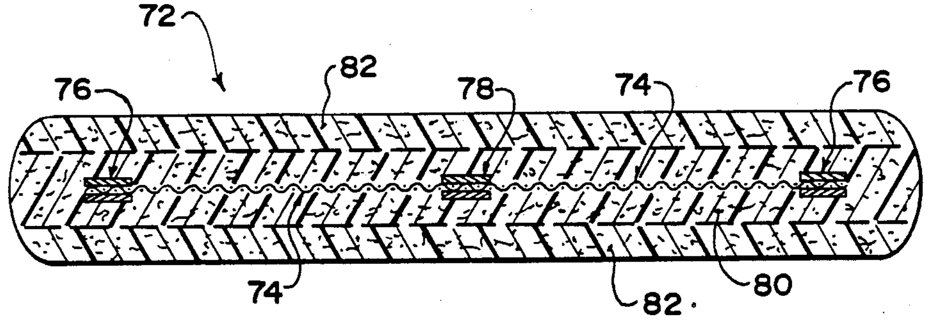
FIG. 7 is a transverse cross section of a still further embodiment of the heater.

FIGS. 5, 6 and 7 illustrate alternative forms of the heater. In FIG. 5, the heater 52 has a heating element 54 with a bus 56 along each of its longitudinal edges. This element is embedded in a matrix 58 of thermosetting resin reinforced with a fibreglass mat on either side of the heating element. No grounding layers are used.

In FIG. 6, the heater 60 has a heating element 62 and two ground layers in the form of perforated foils 66 located between the heating element 62 and the surfaces of the heater. Each of the foils 66 has a large number of through holes 68 allowing the resin material to thoroughly impregnate the foil and integrate it into the structure of the heater.

The heater 72 of FIG. 7 has a heating element 74 that carries two buses 76 along its longitudinal edges and a bus 78 at the centre. This allows the use of a higher voltage to operate the heater, say 220 volts AC with a 110 volt potential between the centre bus 78 and each of the edge buses 76. The heating element 74 is embedded in the fibreglass mat reinforced matrix 80, and on either side of the heating element is a layer of conductive fibreglass reinforcement 82, also impregnated by the resin material. The conductive fibreglass reinforcement serves as a ground layer in this embodiment.

The preferred thermosetting resin is polyester resin. Others may also be used, for example phenol, epoxy and vinylester resins. It has been found that added benefits of using thermosetting resins are high temperature resistance and additional curing that may take place in use as a result of continued heating. A sample panel has been found to sustain a temperature of 600° F. (315° C.), much higher than could be expected with conventional heaters.

The heating panels have numerous different applications and may be constructed with a wide variety of internal structures, including various different insulating, ground and heating element configurations. The net elements may be made in different wattage ratings and to accommodate different voltages, and AC or DC current. The invention is therefore not to be considered limited to the embodiments described in the foregoing. The scope of the invention is to be ascertained solely by reference to the appended claims.

I claim:

1. An electric heater panel including: a heating element comprising an open mesh net of heat resistant filaments carrying electrically resistive material and conductive buses connected to the material at spaced locations thereon; and a rigid matrix of cured, thermosetting synthetic resin in which the net and buses are embedded, the resin being reinforced on opposite sides of the net with an electrically insulating heat-resistant fibre material.

2. A heater according to claim 1 wherein the filaments of the net comprise glass fibre material.

3. A heater according to claim 2 wherein the electrically resistive material is carbon.

4. A heater according to claim 1 wherein the buses comprise strips of flexible, electrically conductive foil mechanically secured to the net along opposite edges thereof.

5. A heater according to claim 1 wherein the resin is a polyester resin.

6. A heater according to claim 1 including an electrical ground layer comprising a conductive layer on each side of the heating element, separated therefrom by a layer of the fibre reinforced synthetic resin.

7. An electric heater including: a heating element comprising an open mesh net of heat-resistant filaments carrying electrically resistive material, conductive buses connected to the material at spaced locations thereon, a matrix of cured, thermosetting synthetic resin in which the net and buses are embedded, the resin being reinforced on opposite sides of the net with an electrically insulating heat-resistant fibre material and an electrical ground layer comprising a conductive foraminous material layer embedded within the body of fibre reinforced resin material on each side of the heating element and separated therefrom by a layer of the fibre reinforced synthetic resin.

8. A heater according to claim 7 wherein each ground layer is a metal screen.

9. A heater according to claim 7 wherein each ground layer is a perforated foil.

10. An electric heater including: a heating element comprising an open mesh net of heat-resistant filaments carrying electrically resistive material, conductive buses connected to the material at spaced locations thereon, a matrix of cured, thermosetting synthetic resin in which the net and buses are embedded, the resin being reinforced on opposite sides of the net with an electrically insulating, heat-resistant fibre material, and an electrical ground layer comprising a conductive fibreglass mat impregnated with the resin on each side of the heating element and separated therefrom by a layer of the fibre reinforced synthetic resin.

11. A heater according to claim 1 including a plurality of buses spaced apart across the heating element.

12. A heater according to claim 1 wherein the resin is selected from the group comprising polyester, phenol, epoxy and vinylester resins.

13. A method of manufacturing a heating panel comprising:

locating an open mesh net of heat resistant filaments carrying an electrically resistive material and spaced apart conductive buses between two layers of electrically insulating fibre reinforcing material, thereby to provide a mat;

impregnating the mat with a liquid, thermosetting synthetic resin; and pultruding the impregnated mat to cure the resin to a solid.

14. A method according to claim 13 further comprising locating a ground layer of electrically conductive material on the outer side of each layer of fibre reinforcing material before impregnating the mat.

15. A method according to claim 14 further comprising locating a layer of electrically insulating reinforcing fibres over each ground layer before impregnating the mat.

16. A method according to claim 13 including supplying the fibre reinforcing material as running lengths of material from a substantially continuous supply.

17. A method according to claim 16 including supplying the net as a running length of material from a substantially continuous supply.

18. A method according to claim 13 including securing the mat together before it is impregnated with the resin.

19. A method according to claim 18 wherein the mat is secured together by stitching.

* * * * *